(12) United States Patent
Hung et al.

(10) Patent No.: US 8,341,330 B2
(45) Date of Patent: Dec. 25, 2012

(54) METHOD AND SYSTEM FOR ENHANCED READ PERFORMANCE IN SERIAL PERIPHERAL INTERFACE

(75) Inventors: Chun-Hsiung Hung, Hsinchu (TW);
Kuen-Long Chang, Taipei (TW);
Chia-He Liu, Taoyuan (TW)

(73) Assignee: Macronix International Co., Ltd., Hsinchu (TW)

( * ) Notice: Subject to any disclaimer, the term of this patent is extended or adjusted under 35 U.S.C. 154(b) by 397 days.

(21) Appl. No.: 11/970,468

(22) Filed: Jan. 7, 2008

(65) Prior Publication Data
US 2009/0177817 A1   Jul. 9, 2009

(51) Int. Cl.
*G06F 12/00* (2006.01)
(52) U.S. Cl. ........................ 711/103; 711/154
(58) Field of Classification Search .................. 711/103, 711/154
See application file for complete search history.

(56) References Cited

U.S. PATENT DOCUMENTS

| | | | |
|---|---|---|---|
| 5,900,014 A * | 5/1999 | Bennett | 711/138 |
| 5,966,723 A | 10/1999 | James et al. | |
| 7,197,590 B2 * | 3/2007 | Chiu | 710/305 |
| 2004/0168014 A1 * | 8/2004 | Lofgren et al. | 711/103 |
| 2005/0015538 A1 * | 1/2005 | Van't Wout et al. | 711/5 |
| 2006/0067123 A1 * | 3/2006 | Jigour et al. | 365/185.05 |
| 2006/0143366 A1 | 6/2006 | Yang et al. | |
| 2007/0260757 A1 * | 11/2007 | Bueb et al. | 710/5 |

* cited by examiner

*Primary Examiner* — Hashem Farrokh
(74) *Attorney, Agent, or Firm* — Kilpatrick Townsend & Stockton LLP (57) ABSTRACT

A method for reading data in an integrated circuit includes receiving a read command, which is associated with an enhanced data read, and receiving a first address from a plurality of input/output pins. The method includes receiving a first performance enhancement indicator and determining whether an enhanced read operation is to be performed based on at least information associated with the first performance enhancement indicator. The method includes waiting n clock cycles, where n is an integer, then outputting data from a memory array in the integrated circuit using the plurality of input/output pins concurrently. The method also includes performing an enhanced read operation, if it is determined that the enhanced read operation is to be performed. In an embodiment of the method, performing an enhanced read operation includes receiving a second address and a second performance enhance indicator without receiving a read command.

12 Claims, 8 Drawing Sheets

METHOD AND SYSTEM FOR ENHANCED READ PERFORMANCE IN SERIAL PERIPHERAL INTERFACE

BACKGROUND OF THE INVENTION

The present invention is directed to integrated circuits and their operation. More particularly, the invention provides a method and system for enhanced data read performance in an integrated circuit. Merely by way of example, the invention has been applied to serial memory devices incorporating a serial peripheral interface protocol for fast data transfer rate. But it would be recognized that the invention has a much broader range of applicability. For example, the invention can be applied to integrated circuits including other stand-alone or embedded memory devices such as DRAM, SRAM, parallel flash, or other non-volatile memories. The present invention can also be applied to a serial peripheral interface for use in communication between electronic devices.

Flash memories are used in a variety of applications in electronics. These memory devices often include a large number of input and output pins to accommodate data and addresses required to access the memory cells. In response to increasing space and wiring demands, serial flash memories have been developed to provide reduced pin counts, often requiring only one or two data pins. These serial flash memories provide a storage solution for systems with limited space, pin connections, and power supplies. Serial flash memories can be used for code download applications, as well as for storage of voice, video, text, and data, etc. However, conventional serial flash memory devices have many limitations. For example, a conventional serial peripheral interface flash memory device transfers data or address bits in a sequential and serial fashion, limiting the speed of the memory device.

From the above, it is seen that an improved technique for serial peripheral interface is desired.

BRIEF SUMMARY OF THE INVENTION

The present invention is directed to integrated circuits and their operation. More particularly, this invention provides a method and system for enhanced data read performance in an integrated circuit. Merely by way of example, the invention has been applied to serial memory devices incorporating a serial peripheral interface protocol for fast data transfer rate. But it would be recognized that the invention has a much broader range of applicability. For example, the invention can be applied to integrated circuits including other stand-alone or embedded memory devices such as DRAM, SRAM, parallel flash, or other non-volatile memories. The present invention can also be applied to a serial peripheral interface for use in communication between electronic devices.

According to a specific embodiment, the invention provides a method for reading data in an integrated circuit. The method includes receiving a read command, which is associated with an enhanced data read, and receiving a first address from a plurality of input/output pins. The method includes receiving a first performance enhancement indicator and determining whether an enhanced read operation is to be performed based on at least information associated with the first performance enhancement indicator. The method includes waiting n clock cycles, where n is an integer, then outputting data from a memory array in the integrated circuit using the plurality of input/output pins concurrently. The data is associated with the first read address. The method also includes performing an enhanced read operation, if it is determined that the enhanced read operation is to be performed based on at least information associated with the performance enhancement indicator.

In a specific embodiment, performing the enhanced read operation includes receiving a second address from the corresponding plurality of input/output pins, receiving a second performance enhancement indicator and determining whether an enhanced read operation is to be performed based on at least information associated with the second performance enhancement indicator, and waiting n clock cycles, where n is an integer, then outputting data in the integrated circuit using the plurality of input/output pins, the data being associated with the second read address.

In an embodiment, the method also includes determining whether a second enhanced read operation is to be performed based on at least information associated with the second performance enhancement indicator. In an embodiment, determining whether an enhanced read operation is to be performed comprises comparing a first bit in the first performance enhancement indicator with a second bit in the first performance enhancement indicator. In a specific embodiment, the integrated circuit comprises a serial peripheral interface pin configuration, the pin configuration including pin #1 (CS#), pin #2 (SO/SIO1), pin #3 (WP#/SIO2), pin #4 (GND), pin #5 (SI/SIO0), pin #6 (SCLK), pin #7 (HOLD#/SIO3), and pin #8 (VCC). In an embodiment, the first address is received in six clock cycles. In a specific embodiment, the first performance enhancement indicator includes indicator bits P4, P5, P6, and P7 received in a first enhance indicator clock cycle and indicator bits P0, P1, P2, and P3 received in a second enhance indicator clock cycle. Each of the indicator bits received in the first enhance indicator clock cycle is compared to a corresponding one of the indicator bits received in the second enhance indicator clock cycle. In an embodiment, an enhanced read operation is determined to be performed if the following condition holds: P7≠P3 AND P6≠P2 AND P5≠P1 AND P4≠P0.

According to another embodiment, the invention provides a method for reading data in an integrated circuit. The method includes receiving a read command, which is associated with reading data in the same page. The method includes receiving a first address from a corresponding plurality of input/output pins, and receiving a first performance enhancement indicator and determining whether an enhanced read operation is to be performed based on at least information associated with the first performance enhancement indicator. The method includes waiting n clock cycles, where n is an integer, then outputting data from the memory array using the plurality of input/output pins concurrently. The data is associated with the first read address. The method also includes performing an enhanced page read operation, if it is determined that the enhanced read operation is to be performed based on at least information associated with the performance enhancement indicator.

In a specific embodiment, performing the enhanced page read operation includes receiving a second address from the corresponding plurality of input/output pins, receiving a second performance enhancement indicator and determining whether an enhanced read operation is to be performed based on at least information associated with the second performance enhancement indicator, and waiting n clock cycles then outputting data in the memory array in the integrated circuit using the plurality of input/output pins. The data is associated with the second read address. In an embodiment, the integrated circuit includes a serial peripheral interface pin configuration, the pin configuration including pin #1 (CS#), pin #2 (SO/SIO1), pin #3 (WP#/SIO2), pin #4 (GND), pin #5 (SI/SIO0), pin #6 (SCLK), pin #7 (HOLD#/SIO3), and pin #8 (VCC).

According to an alternative embodiment, the invention provides a system for enhanced data read. The system includes one or more components configured to receive a read command, which associated with an enhanced data read operation. The system includes one or more components configured to receive a first address from a plurality of input/output pins. The system includes one or more components configured to receive a first performance enhancement indicator. The system also includes one or more components configured to determine whether an enhanced read operation is to be performed based on at least information associated with the first performance enhancement indicator. The system includes one or more components configured to wait n clock cycles. where n is an integer, then output data from a memory array in the integrated circuit using the plurality of input/output pins, the data being associated with the first read address. The system includes one or more components configured to perform the enhanced read operation if it is determined that the enhanced read operation is to be performed.

In a specific embodiment, the one or more components for performing the enhanced read operation comprise one or more components for performing the following functions:
1. receiving a second address from the plurality of input/output pins;
2. receiving a second performance enhancement indicator; and
3. waiting n clock cycles, where n is an integer, then outputting data in the memory array in the integrated circuit using the plurality of input/output pins, the data being associated with the second read address.

In an embodiment, the system also includes one or more components for determining whether a second enhanced read operation is to be performed based on at least information associated with the second performance enhancement indicator. In a specific embodiment, the system comprises an integrated circuit which includes a serial peripheral interface pin configuration, the pin configuration including pin #1 (CS#), pin #2 (SO/SIO1), pin #3 (WP#/SIO2), pin #4 (GND), pin #5 (SI/SIO0), pin #6 (SCLK), pin #7 (HOLD#/SIO3), and pin #8 (VCC). In an embodiment, the first plurality of address segments are received in six clock cycles. In some embodiments, the first performance enhancement indicator includes indicator bits P4, P5, P6, and P7 received in a first enhance indicator clock cycle and indicator bits P0, P1, P2, and P3 received in a second enhance indicator clock cycle, wherein an enhanced read operation is determined to be performed if the following condition holds: P7≠P3 AND P6≠P2 AND P5≠P1 AND P4≠P0.

According to another alternative embodiment, the present invention provides a method for data read in an integrated circuit. The method includes receiving a first read command associated with an enhanced data read and processing information associated with the first read command. The method includes receiving a first plurality of address segments, each of the first plurality of address segments being received from each of a corresponding plurality of input/output pins concurrently. The method includes generating a first read address based on at least information associated with the first plurality of address segments. The method also includes receiving a first performance enhancement indicator and determining whether an enhanced read operation is to be performed based on at least information associated with the first performance enhancement indicator. The method includes outputting data associated with the first read address from a memory array in the integrated circuit using the plurality of input/output pins concurrently. The method includes performing an enhanced read operation, if it is determined that the enhanced read operation is to be performed based on at least information associated with the performance enhancement indicator.

In an embodiment of the method, the enhanced read operation includes receiving a second plurality of address segments, each of the second plurality of address segments being received from each of the corresponding plurality of input/output pins concurrently. The method includes generating a second read address based on at least information associated with the second plurality of address segments. The method includes receiving a second performance enhancement indicator and outputting data in the memory array in the integrated circuit using the plurality of input/output pins concurrently, the data being associated with the second read address. In a specific embodiment, the method also includes determining whether a second enhanced read operation is to be performed based on at least information associated with the second performance enhancement indicator. For example, in an embodiment, determining whether an enhanced read operation is to be performed includes comparing a first bit in the first performance enhancement indicator with a second bit in the first performance enhancement indicator.

In an embodiment of the method, the integrated circuit includes a serial peripheral interface pin configuration, which includes pin #1 (CS#), pin #2 (SO/SIO1), pin #3 (WP#/SIO2), pin #4 (GND), pin #5 (SI/SIO0), pin #6 (SCLK), pin #7 (HOLD#/SIO3), and pin #8 (VCC). In a specific embodiment, the first read command includes a read command. In an embodiment, the first plurality of address segments are received in six clock cycles. In an embodiment, the first performance enhancement indicator includes indicator bits P4, P5, P6, and P7 received in a first enhance indicator clock cycle and indicator bits P0, P1, P2, and P3 received in a second enhance indicator clock cycle. Each of the indicator bits received in the first clock cycle is compared to a corresponding one of the indicator bits received in the second clock cycle. In a specific embodiment, an enhanced read operation is determined to be performed if the following condition holds: P7≠P3 AND P6≠P2 AND P5≠P1 AND P4≠P0.

According to yet another embodiment, the method provides a method for data read in an integrated circuit. The method includes receiving a first read command associated with an enhanced page read and processing information associated with the first read command. The method includes receiving a first plurality of address segments, each of the first plurality of address segments being received from each of a corresponding plurality of input/output pins concurrently. A first read address is generated based on at least information associated with the first plurality of address segments. The first read address is associated with a first page in a memory array in the integrated circuit. The method includes receiving a first performance enhancement indicator and determining whether an enhanced read operation is to be performed based on at least information associated with the first performance enhancement indicator. The method also includes outputting data associated with the first read address in the memory array using the plurality of input/output pins concurrently. If it is determined that the enhanced read operation is to be performed based on at least information associated with the first performance enhancement indicator, the method includes the following processes for performing the enhanced page read operation. The method includes receiving a second plurality of address segments, each of the second plurality of address segments being received from each of the corresponding plurality of input/output pins concurrently. A second read address is generated based on at least information associated with the second plurality of address segments and the first plurality of address segments. The method includes receiving a second performance enhancement indicator and outputting data in the memory array in the integrated circuit using the plurality of input/output pins concurrently, the data being associated with the second read address. In an embodiment, the second read address is associated with the first page in the memory array in the integrated circuit. The method also includes determining whether a second enhanced read operation is to be performed based on at least information associated with the second performance enhancement indicator.

In a specific embodiment of the method, the integrated circuit which includes a serial peripheral interface pin configuration, which includes pin #1 (CS#), pin #2 (SO/SIO1), pin #3 (WP#/SIO2), pin #4 (GND), pin #5 (SI/SIO0), pin #6 (SCLK), pin #7 (HOLD#/SIO3), and pin #8 (VCC). In an embodiment, the first read command includes a read command for enhanced page read. In a specific embodiment, the page in the memory array comprises n byes (for example: n=256). In an embodiment, the second plurality of address segments are received in m clock cycles (for example: m=2).

According to another alternative embodiment, the invention provides a system for enhanced data read. The system includes one or more components configured to:
1. receive a first read command, which is associated with an enhanced data read;
2. process information associated with the first read command;
3. receive a first plurality of address segments, each of the first plurality of address segments being received from each of a corresponding plurality of input/output pins concurrently;
4. generate a first read address based on at least information associated with the first plurality of address segments;
5. receive a first performance enhancement indicator and determine whether an enhanced read operation is to be performed based on at least information associated with the performance enhancement indicator;
6. output data from a memory array in the integrated circuit using the plurality of input/output pins concurrently, the data being associated with the first read address; and
7. perform an enhanced read operation, if the enhanced read operation is to be performed.

In an embodiment, the system includes one or more components for determining whether a second enhanced read operation is to be performed based on at least information associated with the second performance enhancement indicator. In a specific embodiment, the system includes components for performing the enhanced read operation, for example components for:
1. receiving a second plurality of address segments, each of the second plurality of address segments being received from each of the corresponding plurality of input/output pins concurrently;
2. generating a second read address based on at least information associated with the second plurality of address segments;
3. receiving a second performance enhancement indicator and determining whether a second enhanced read operation is to be performed based on at least information associated with the second performance enhancement indicator; and
4. outputting data in the memory array in the integrated circuit using the plurality of input/output pins concurrently, the data being associated with the second read address.

In a specific embodiment, the system includes an integrated circuit which includes a serial peripheral interface pin configuration, the pin configuration including pin #1 (CS#), pin #2 (SO/SIO1), pin #3 (WP#/SIO2), pin #4 (GND), pin #5 (SI/SIO0), pin #6 (SCLK), pin #7 (HOLD#/SIO3), and pin #8 (VCC). In an embodiment, the first plurality of address segments are received in six clock cycles. In a specific embodiment of the system, the first performance enhancement indicator includes four indicator bits P4, P5, P6, and P7 received in a first clock cycle and four indicator bits P0, P1, P2, and P3 received in a second clock cycle, and an enhanced read operation is determined to be performed if the following condition holds: $P7 \neq P3$ AND $P6 \neq P2$ AND $P5 \neq P1$ AND $P4 \neq P0$.

Many benefits can be achieved by way of the present invention over conventional techniques. For example, in an embodiment, the present technique provides an easy to use method that relies upon conventional serial peripheral interface pin out technology. In embodiments of the invention, the data and address transfer rates are increased. In some embodiments, the invention provides methods for high speed and random read operation. In a specific embodiment, a page read method is provided for random accessing of data in a page without repeating redundant address bits. Depending upon the embodiment, one or more of these benefits may be achieved. These and other benefits will be described in more detail throughout the present specification and more particularly below.

Various additional objects, features, and advantages of the present invention can be more fully appreciated with reference to the detailed description and accompanying drawings that follow.

DETAILED DESCRIPTION OF THE INVENTION

The present invention is directed to integrated circuits and their operation. More particularly, this invention provides a method and system for enhanced data read performance in an integrated circuit. Merely by way of example, the invention has been applied to serial memory devices incorporating a serial peripheral interface protocol for fast data transfer rate. But it would be recognized that the invention has a much broader range of applicability. For example, the invention can be applied to integrated circuits including other stand-alone or embedded memory devices such as DRAM, SRAM, parallel flash, or other non-volatile memories. The present invention can also be applied to a serial peripheral interface for use in communication between electronic devices, e.g. microprocessor, components, and other devices.

Depending upon the embodiment, the present invention includes various features, which may be used. These features include the following:

High data transmission rate data read operations using conventional serial peripheral interface pin-out;

Multiple random read operations requiring only one read command; and

Multiple random read operations within a page of data requiring only one read command and partial address information.

As shown, the above features may be in one or more of the embodiments to follow. These features are merely examples, which should not unduly limit the scope of the claims herein. One of ordinary skill in the art would recognize many variations, modifications, and alternatives.

Figure 1:
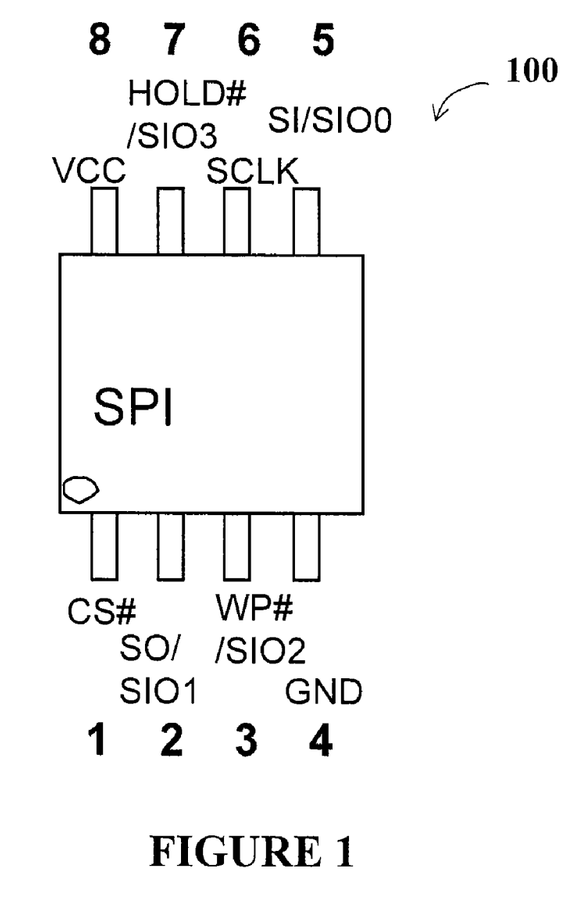
FIG. 1 is a simplified pin out diagram for an integrated circuit which includes a serial memory I/O interface according to an embodiment of the present invention.

FIG. 1 is a simplified pin out diagram for an integrated circuit which includes a serial peripheral interface I/O according to an embodiment of the present invention. This diagram is merely an example, which should not unduly limit the scope of the claims herein. One of ordinary skill in the art would recognize other variations, modifications, and alternatives. As shown, according to a specific embodiment of the invention, integrated circuit device 100 includes pin #1 CS# (chip select), pin #2 SO (serial data out), pin #3 WP# (write protect), pin #4 GND (ground), pin #5 SI (serial data in), pin #6 SCLK (clock), pin #7 HOLD# (hold), and pin #8 VCC (power supply). In certain embodiments, pin #2 is designated as SO/SIO1, pin #3 is designated as WP#/SIO2, pin 5 is designated as SI/SIO0, and pin #7 is designated as HOLD#/SIO3. In the discussion below, these I/O pins are used in address and data transfers in various methods according to embodiments of the present invention.

Figure 2:
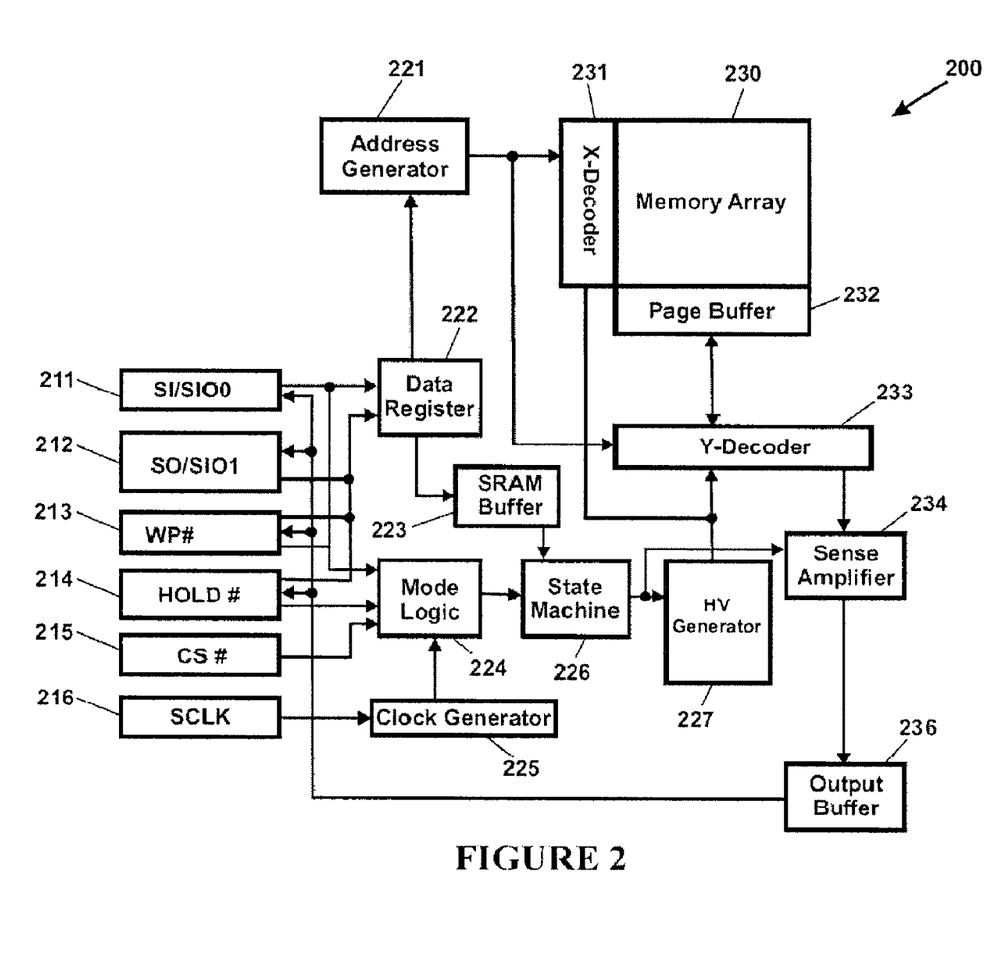
FIG. 2 is a simplified block diagram of an integrated circuit according to an embodiment of the present invention.

FIG. 2 is a simplified block diagram of an integrated circuit according to an embodiment of the present invention. This diagram is merely an example, which should not unduly limit the scope of the claims herein. One of ordinary skill in the art would recognize other variations, modifications, and alternatives. As shown, integrated circuit device 200 includes several input blocks coupled to respective input/output pins. In a specific embodiment, the integrated circuit device includes I/O pins consistent with the serial peripheral interface pin assignment discussed above. For example, device 200 may include I/O pins coupled to the following input/output circuit blocks.

SI/SIO0 pin coupled to SI/SIO0 block 211;
SO/SIO1 pin coupled to SO/SIO1 block 212,
WP#/SIO2 pin coupled to WP# block 213,
HOLD#/SIO3 pin coupled to HOLD# block 214,
CS# pin coupled o CS# block 215, and
SCLK pin coupled to SCLK block 216.

As shown in FIG. 2, device 200 also includes the following circuit blocks associated with the memory array 230.

Memory Array 230,
X-Decoder 231,
Page Buffer 232,
Y-decoder 233,
Sense Amplifier 234, and
Output Buffer 236.

Device 200 also includes the following control and support circuit blocks.

Address Generator 221,
Data Register 222,
SRAM Buffer 223,
Mode Logic 224,
Clock Generator 225,
State Machine 226, and
HV Generator 227.

Merely as examples, certain operations of device 200 are now discussed according to a specific embodiment of the present invention. System clock signal SCLK on input terminal 216 is coupled to Clock Generator 225, which in turn is coupled to Mode Logic 224. Mode Logic 224 is operably coupled to receive a chip select signal CS# on CS# input terminal 215. Commands or instructions may be input through input SI/SIO0 block 211 and then transferred to Data Register 222 and Mode Logic 224. Mode Logic 224, in combination with State Machine 226, interprets and executes the command such as a read, erase, or write operation. In an embodiment, Mode Logic 224 also receives a signal from WP# block 213 to perform a write protect function, and a signal from HOLD# block 214 to keep a clock signal from entering the State Machine 226.

According to a specific embodiment, data may be input through SI/SIO0 block 211, SO/SIO1 block 212, WP# block 213, and HOLD# block 214, which are coupled to Data Register 222. Data Register 222 is coupled to SRAM Buffer 223 for temporary storage. Data may be output through SI/SIO0 block 211, SO/SIO1 block 212, WP# block 213, and HOLD# block 214, which are coupled the Output Buffer 236. A data address corresponding to a location in memory array 230 may be supplied from Data Register 222 to Address Generator 221. The address is then decoded by X-decoder 231 and Y-decoder 233. Page Buffer 232 is coupled to memory array 230 to provide temporary storage for memory operation. In a read operation, the data is transferred from memory array 230 through Sense Amplifier 234 to the Output Buffer 236. For a write, or program, operation, data is transferred from Data Register to Page Buffer 232 and then written into Memory Array 230. For high voltage operation, e.g., for a write operation, High Voltage Generator 227 is activated.

Although the above has been shown using a selected group of components for the integrated circuit device, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and more particularly below.

Figure 3:
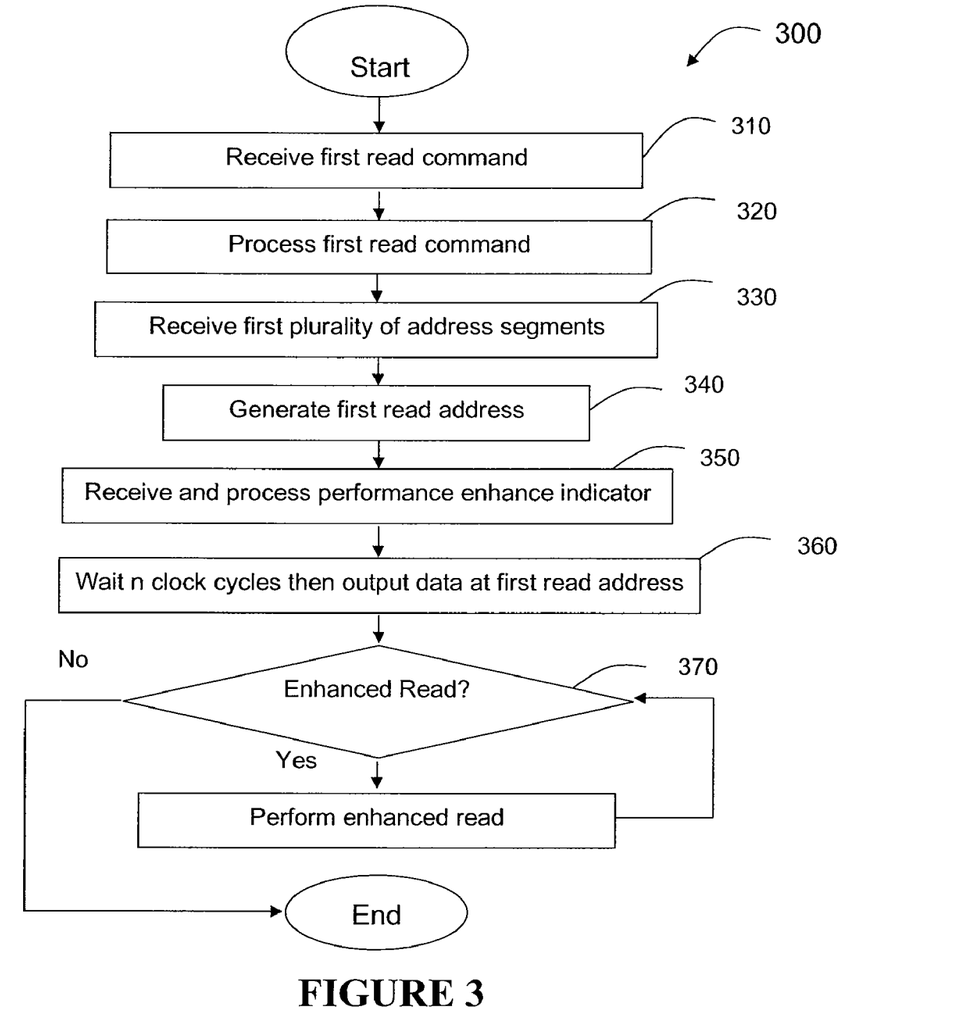
FIG. 3 is a simplified flow chart for an enhance data read method according to an embodiment of the present invention.

FIG. 3 is a simplified flow chart for an enhanced data read method according to an embodiment of the present invention. This diagram is merely an example, which should not unduly limit the scope of the claims herein. One of ordinary skill in the art would recognize other variations, modifications, and alternatives. As shown, the method for the enhanced data read can be briefly outlined below.

1. (Process 310) Receive a first read command;
2. (Process 320) Process information associated with the first read command;
3. (Process 330) Receive a first plurality of address segments;
4. (Process 340) Generate a first read address based on at least information associated with the address segments;
5. (Process 350) Receive a first performance enhancement indicator and determine whether an enhanced read operation is to be performed;
6. (Process 360) Wait n clock cycles, where n is an integer, then output data from a memory array in the integrated circuit; and
7. (Process 370) Perform an enhanced read operation, if it is determined that enhanced read operation is to be performed.

The above sequence of processes provides an enhanced data read method according to an embodiment of the present invention. As shown, the method uses a combination of processes including a way of transmitting address and data information using a plurality of pins concurrently, and performing multiple data read operations in response to performance enhance indicator information. Other alternatives can also be provided where processes are added, one or more processes are removed, or one or more processes are provided in a different sequence without departing from the scope of the claims herein. Further details of the present method can be found throughout the present specification and more particularly below.

Figure 4A:
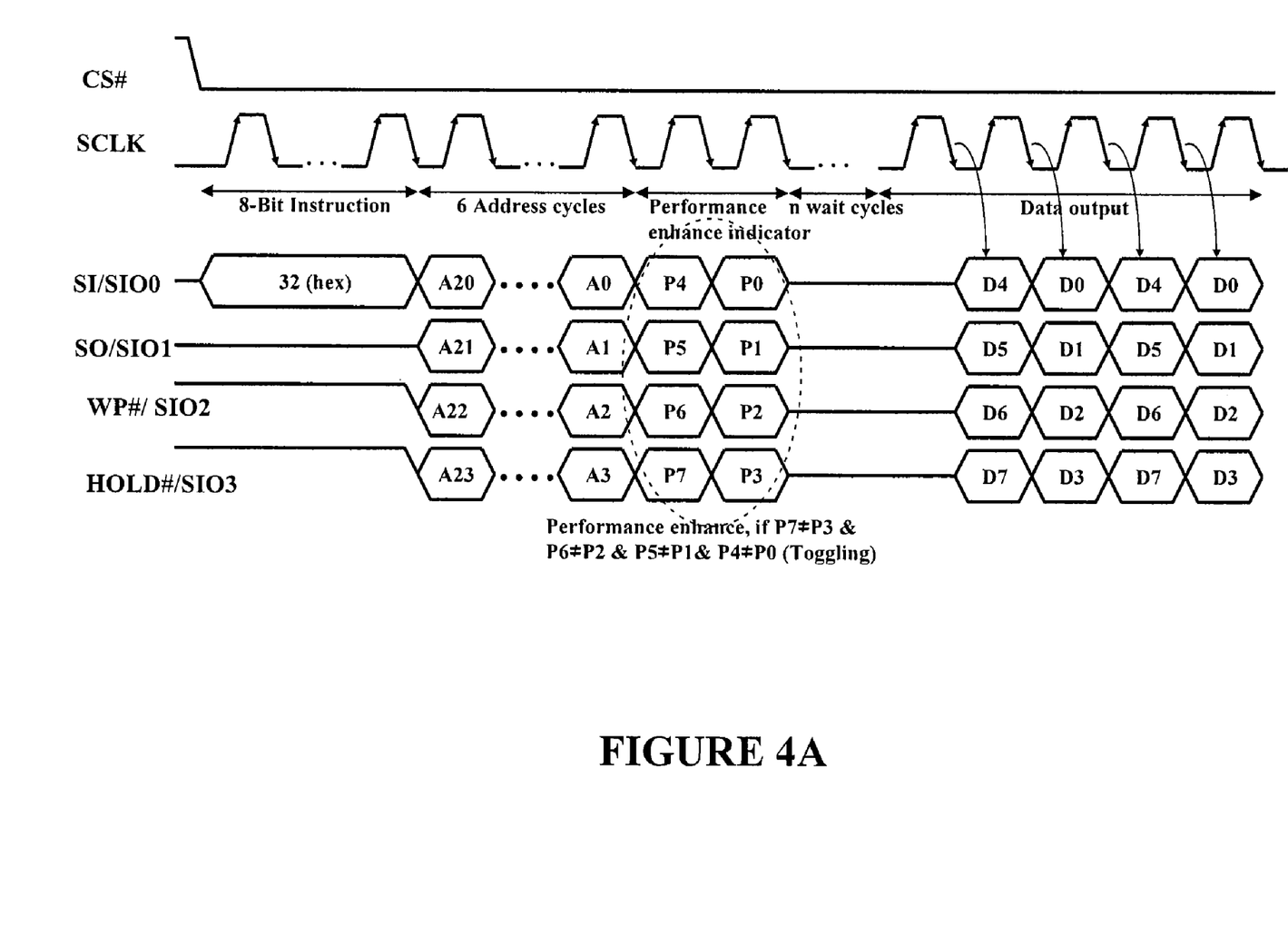
FIGS. 4A and 4B are simplified timing diagrams for an enhanced data read method according to an embodiment of the present invention.
Figure 4B:
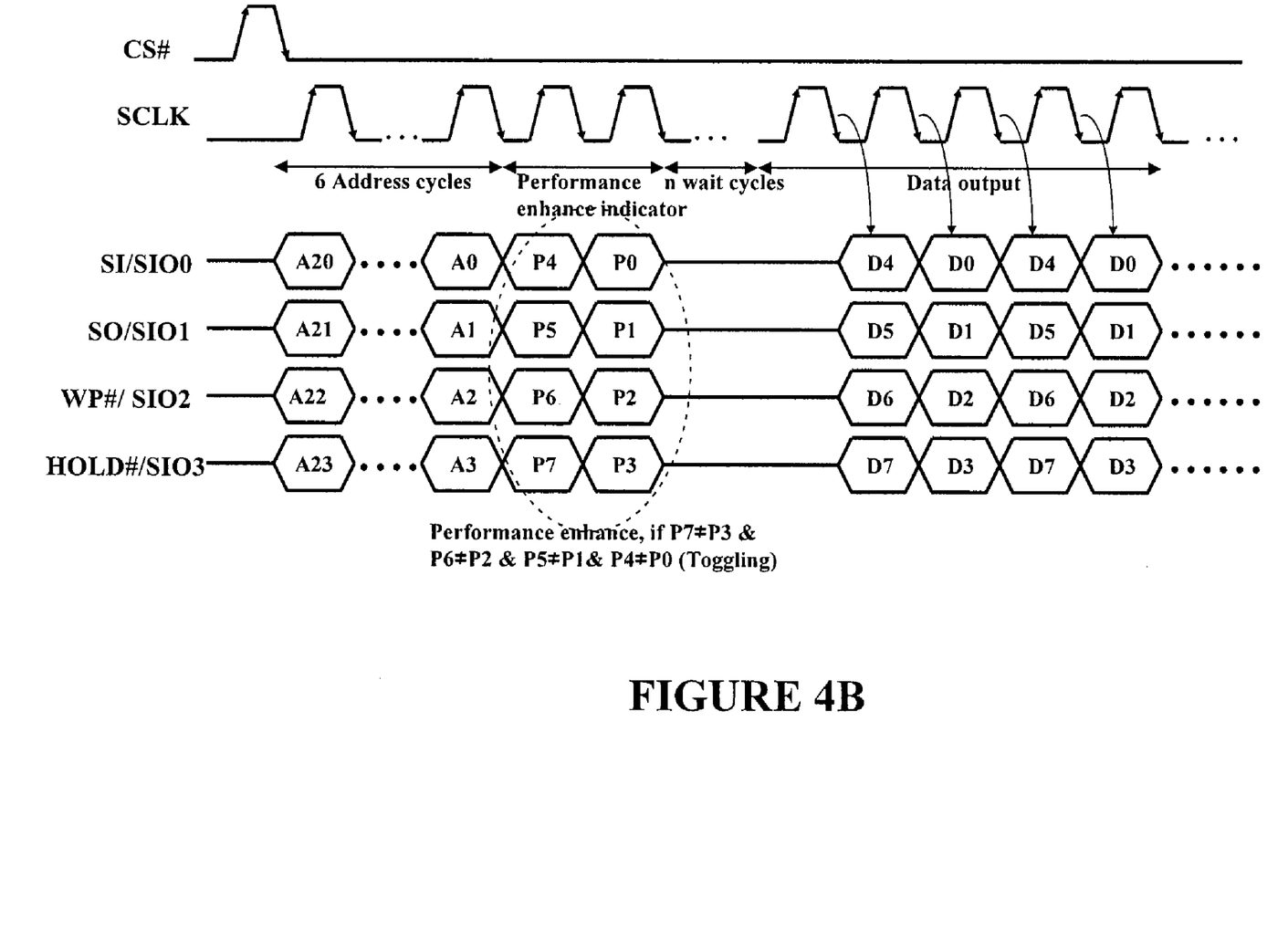

FIGS. 4A and 4B are simplified timing diagrams for an enhanced data read method for an integrated circuit according to an embodiment of the present invention. These diagrams are merely examples, which should not unduly limit the scope of the claims herein. One of ordinary skill in the art would recognize other variations, modifications, and alternatives. The method for enhanced data read utilizing four I/O pins concurrently is now discussed with reference to the simplified flow chart in FIG. 3 and the simplified timing diagrams FIGS. 4A and 4B. In a specific example, a clock rate of 75 MHz is used. In other embodiments, different clock rates may be used depending on the application. As shown, the CS# (chip select) signal is set to low. In Process 310, an 8-bit instruction, designated as 32 (hex), is transferred using the SI/SIO0 pin. In Process 320, the method includes process information associated with the first read command. Referring to FIG. 2, the command is transferred to Mode Logic 224 where it is decoded, and State Machine 226 is activated in preparation for further information regarding the enhance read command. In Process 330, a 24-bit address A0, . . . , A23 is received using pin SI/SIO0, pin SO/SIO1, pin WP#/SIO2, and pin HOLD#/SIO3. Each pin receives a series of address bits, which is designated as an address segment. In a specific embodiment, the 24-bit address is received in six address clock cycles of clock signal SCLK. The timing of address transfer is illustrated in Table 1 below.

TABLE 1

| I/O Pins | Address Clock Cycles | | | | | |
|---|---|---|---|---|---|---|
| | 1 | 2 | 3 | 4 | 5 | 6 |
| SI/SIO0 | A20 | A16 | A12 | A8 | A4 | A0 |
| SO/SIO1 | A21 | A17 | A13 | A9 | A5 | A1 |
| WP#/SIO2 | A22 | A18 | A14 | A10 | A6 | A2 |
| HOLD#/SIO3 | A23 | A19 | A15 | A11 | A7 | A3 |

For example, at the first address clock cycle, address bit A20 is received at pin SI/SIO0, address bit A21 is received at pin SO/SIO1, address bit A22 is received at pin WP#/SIO2, and address bit A23 is received at pin HOLD#/SIO3. Subsequently, address bits A16, A17, A18, and A19 are received concurrently in the second address clock cycle, address bits A12, A13, A14, and A15 are received concurrently in the third address clock cycle, address bits A8, A9, A10, and A11 are received concurrently in the fourth address clock cycle, address bits A4, A5, A6, and A7 are received concurrently in the fifth address clock cycle, and address bits A0, A1, A2, and A3 are received concurrently in the sixth address clock cycle.

Referring to FIG. 2, in an embodiment, the first address segment of address bits A20, A16, A12, A8, A4, and A0 are received using pin SI/SIO0 and transferred from block SI/SIO0 211 to Data Register 222. The second address segment of address bits A21, A17, A13, A9, A5, and A1 are received using pin SO/SIO1 212 and transferred from block SO/SIO1 212 to Data Register 222. The third address segment of address bits A22, A18, A14, A10, A6, and A2 are received using pin WP#/SIO2 and transferred from block WP# 213 to Data Register 222. The fourth address segment of address bits A23, A19, A15, A11, A7, and A3 are received using pin HOLD#/SIO3 and transferred from block HOLD# 214 to Data Register 222. In Process 340, the address segments are transferred to Address Generator block 221, where the address bits in the address segments are assembled into a read address, for example, A24, A23, . . . , A1, A0.

Referring back to FIG. 4A, in the next two clock cycles of SCLK, the method receives a first performance enhancement indicator (Process 350). In a specific embodiment, the first performance enhancement indicator includes eight bits, i.e. P0-P7, which are received using the four I/O pins. For example, four indicator bits P4, P5, P6, and P7 are received in a first enhance indicator clock cycle, and four indicator bits P0, P1, P2, and P3 are received in a second enhance indicator clock cycle. In Process 350, the performance enhancement indicator is processed to determine whether an enhanced read operation is to be performed based on at least information associated with the performance enhancement indicator. In a specific embodiment, each of the four indicator bits received in the first enhance indicator clock cycle is compared to a corresponding one of the four indicator bits received in the second enhance indicator clock cycle. In an example, an enhanced read operation is determined to be performed when the following condition holds: P7≠P3 AND P6≠P2 AND P5≠P1 AND P4≠P0. Of course, there can be other variations and modifications.

In an embodiment, the method includes a waiting period of n wait clock cycles, where n is an integer selected to suit specific applications. In a specific embodiment, the waiting period can be 8 wait clock cycle. In Process 360, the method includes accessing the Memory Array 230 to retrieve data associated with the first read address generated in Process 340. The method also includes outputting the retrieved data from memory array in the integrated circuit using the input/output pins concurrently. As shown in FIG. 4A, a byte of data D0-D7 are transferred in two clock cycles, i.e. data bits D4-D7 are transferred in a first data clock cycle, and data bits D0-D3 are transferred in a second data clock cycle. In an embodiment, the number of bytes being output in each read operation is selected according to application requirements. For example, the number of bytes transferred in a read operation can be one byte, two bytes, or four bytes, etc.

Figure 5:
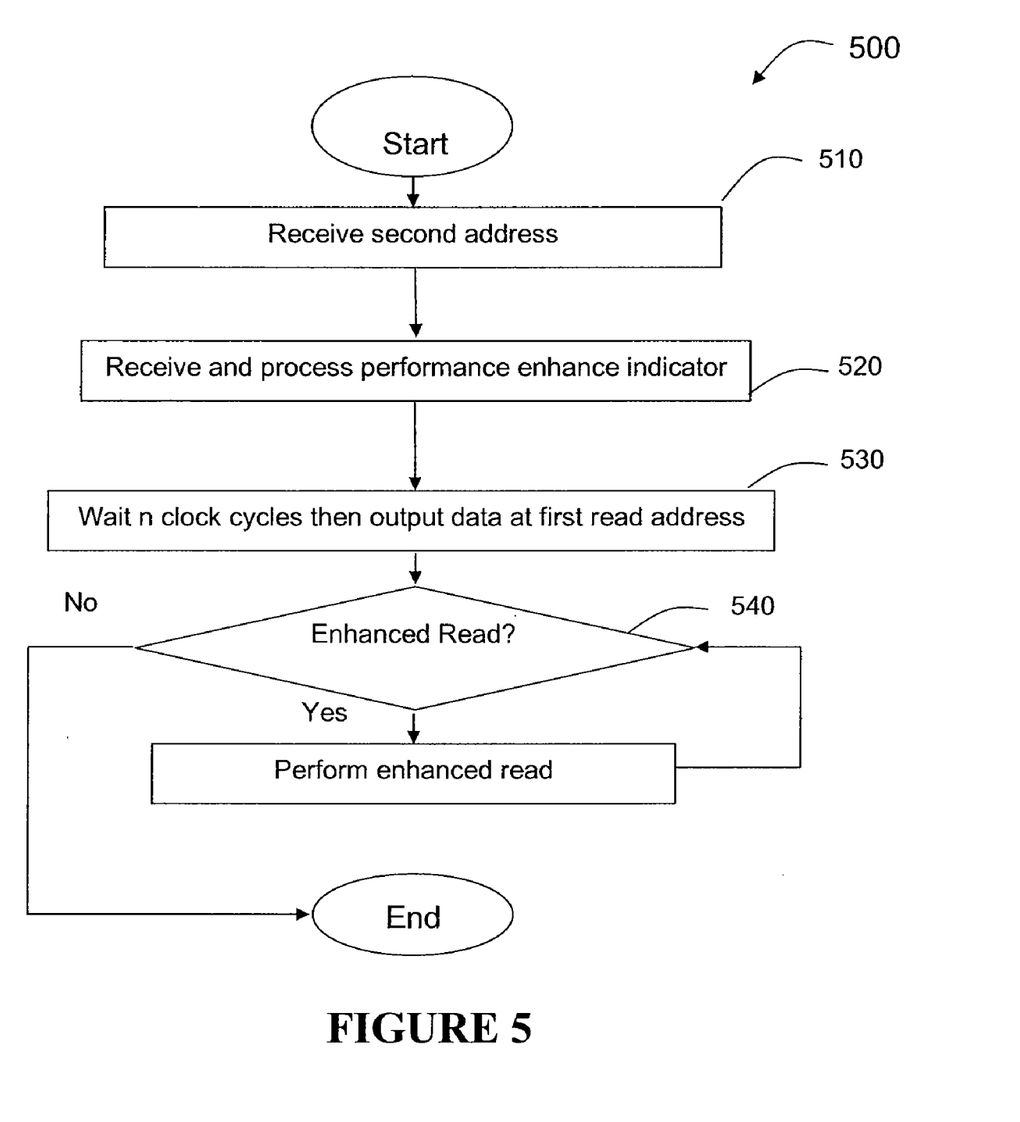
FIG. 5 is a simplified flow chart for an enhance page data read method according to an embodiment of the present invention.

In Process 370, if an enhanced read operation is to be performed based on information associated with the performance enhance indicator, then an enhanced read is carried out. In an embodiment of the enhance read, a data read is carried out without requiring a new read command. Here, address segments for a second read address are received, and a second read address is formed to select a second memory location. In a specific embodiment, the method for enhanced read includes the following processes (FIG. 5).

1. (Process 510) Receiving a second address;
2. (Process 530) Receiving a second performance enhancement indicator;
3. (Process 540) Wait n clock cycles, where n is an integer, then outputting data in the memory array in the integrated circuit using the plurality of input/output pins concurrently; and
4. (Process 550) Determining whether a second enhanced read operation is to be performed based on at least information associated with the second performance enhancement indicator.

In Process 510, a second address is received from the corresponding plurality of input/output pins. For example, in FIG. 4B, address bits A23-A0 are received in address segments at the four I/O pins concurrently. The second address is constituted by A23-A0, so it is independent from the first address. The first address and the second address can be located in different pages In Process 520, a second performance enhancement indicator is received. In FIG. 4B, performance enhance indicator bits P7-P0 are received concurrently at four I/O pins, as discussed above.

In Process 530, the method includes wait n clock cycles, where n is an integer, then outputting data in the memory array in the integrated circuit using the input/output pins concurrently. The data are associated with the second read address. As shown in FIG. 4B, data bits D7-D0 are output using four I/O pins in two clock cycles separately.

In Process 540, the method includes determining whether a second enhanced read operation is to be performed based on at least information associated with the second performance enhancement indicator. Similar to discussions above, performance enhance indicator bits P7-P0 are examined, and an enhanced read is to be performed if the following condition is met: P7≠P3 AND P6≠P2 AND P5≠P1 AND P4≠P0. In an embodiment, the enhanced read is continued as long as the performance enhance indicator is set.

According to the embodiment discussed above, the method for enhanced read continues as required by the performance enhance indicator. Thus, a single read command allows multiple random data read operations. In contrast, conventional techniques allow for a single read operation per each read command. For multiple data read operations, conventional techniques would require a command to be received and decoded for each data read operation, leading to more system overhead.

In certain integrated circuits, a memory array is often organized in pages. In an example, a page includes 256 bytes. In other examples, a page may include 512 bytes, 1K bytes, 4K bytes, etc. In some applications, it may be desirable to perform multiple read operations at different memory locations within a page of a memory array. According to another embodiment of the invention, a method is provided for performing multiple data read operations within a page in a memory array without repeating the read command or repeating duplicate address information. More details of the embodiment are discussed below.

Figure 6A:
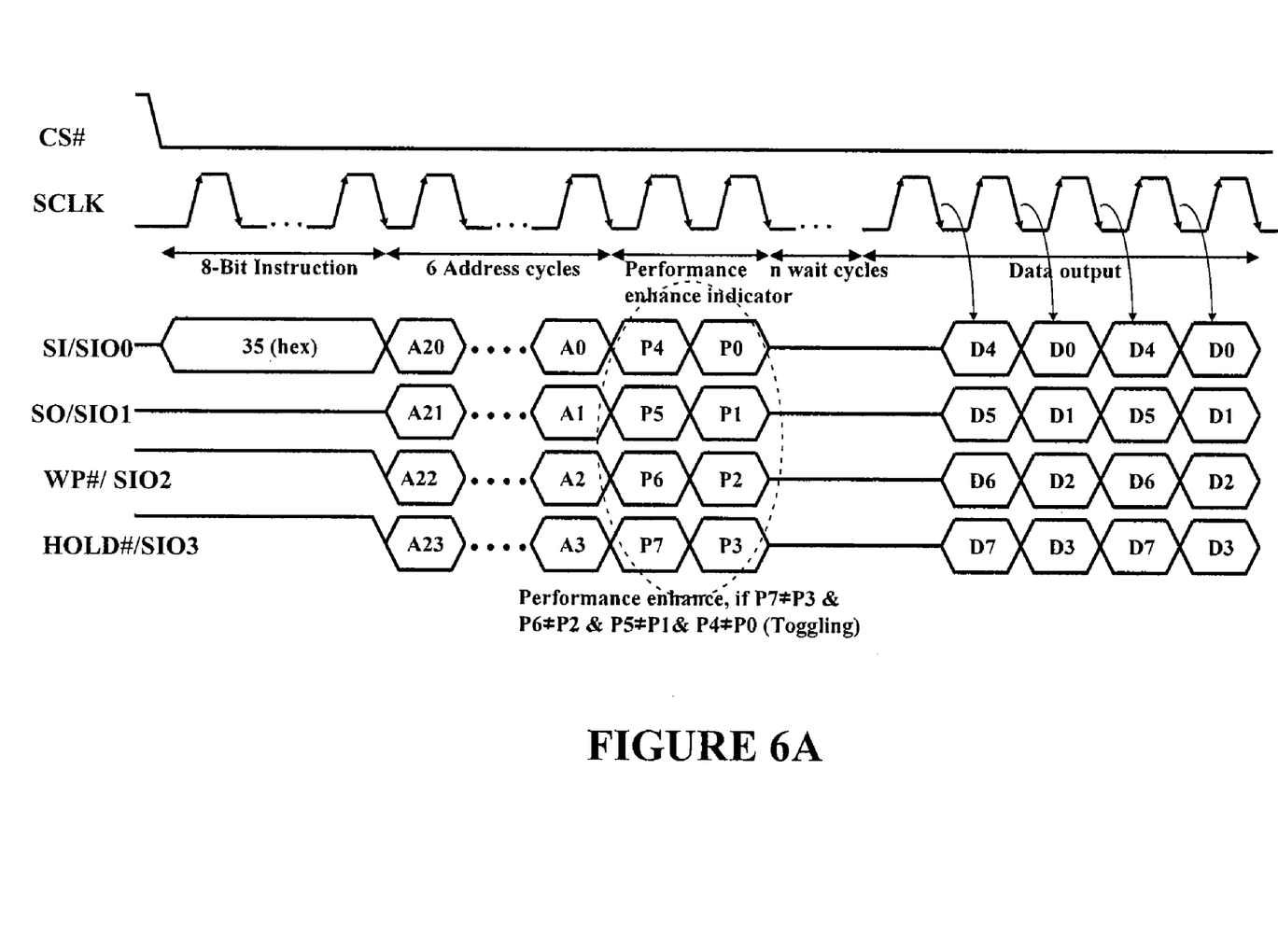
FIGS. 6A and 6B are simplified timing diagrams for an enhanced page read method according to an embodiment of the present invention.
Figure 6B:
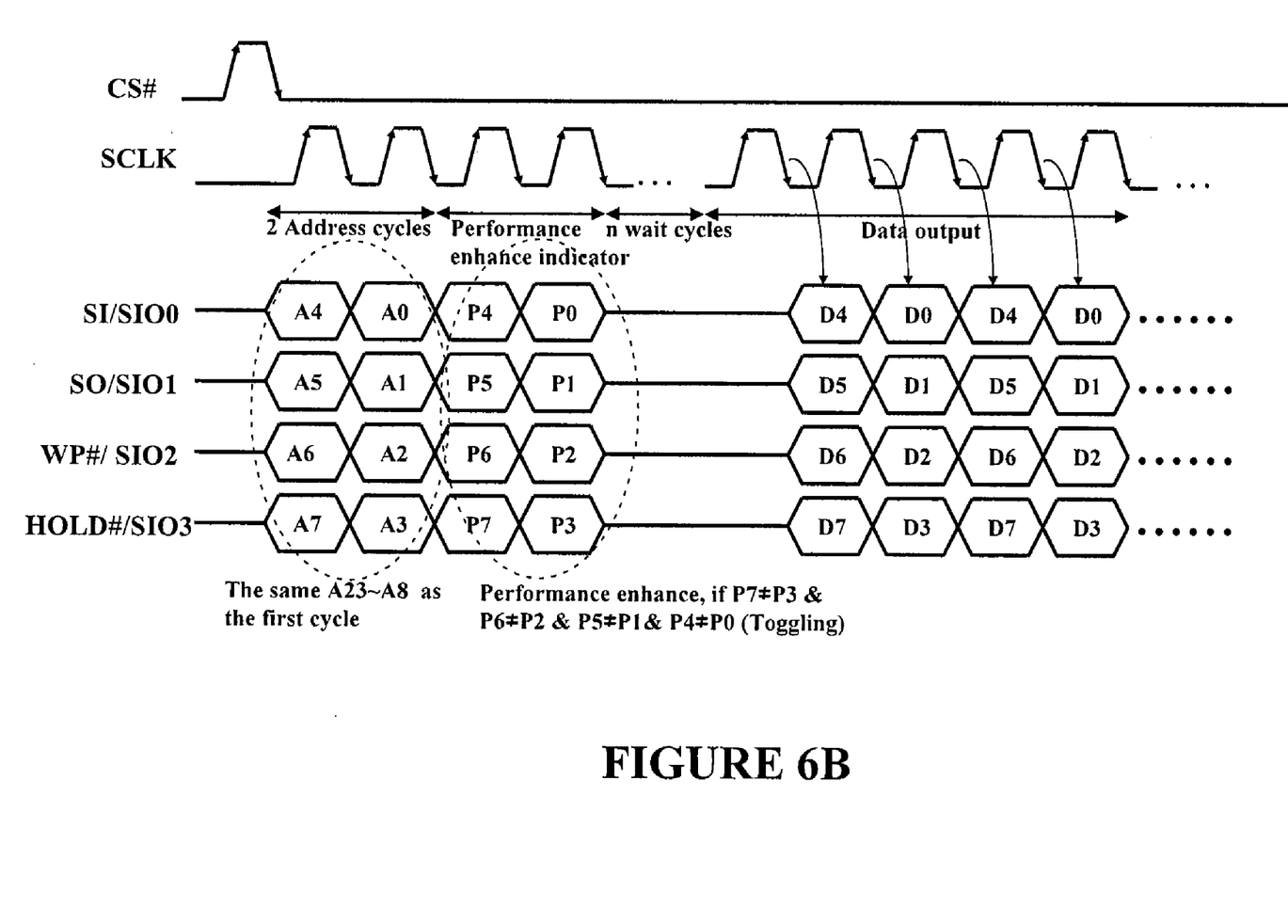

FIGS. 6A and 6B are simplified timing diagrams for an enhanced page read method for an integrated circuit according to an embodiment of the present invention. These diagrams are merely examples, which should not unduly limit the scope of the claims herein. One of ordinary skill in the art would recognize other variations, modifications, and alternatives. The method for enhanced page read includes multiple data read operations within a page of a memory array. The enhanced page read method includes the following processes.
1. Receive a first read command;
2. Process information associated with the first read command;
3. Receive a first plurality of address segments;
4. Generate a first read address based on at least information associated with the address segments;
5. Receive a first performance enhancement indicator and determine whether an enhanced read operation is to be performed;
6. Wait n clock cycles, where n is an integer, then output data from a memory array in the integrated circuit; and
7. If the enhanced read operation is to be performed, perform an enhanced read operation.

As shown, the method for enhanced page read includes processes similar to processes described above for the enhanced read method. However, in contrast to the method in FIG. 3 for reading random memory locations, the method for enhanced page read includes performing multiple data read operations at memory locations in a specific page of the memory array. The method is discussed further below.

As shown in FIG. 6B, if the enhanced page read operation is to be performed for enhanced page read, a second read address A7-A0 are formed to select a second memory location in the same page as the first memory location associated with the first read address. Bits A23-A8 are specified to different pages, and bits A7-A0 are specified to different bytes in the same page in this embodiment. In a specific embodiment, the method for enhanced page read includes the following processes.
1. Receiving a second page address;
2. Receiving a second performance enhancement indicator;
3. Wait n clock cycles, where n is an integer, then outputting data in the memory array in the integrated circuit using the plurality of input/output pins concurrently; and
4. Determining whether a second enhanced read operation is to be performed based on at least information associated with the second performance enhancement indicator.

In the FIG. 6B, a second plurality of address segments are received. Each of the second plurality of page address segments is received from each of the corresponding plurality of input/output pins concurrently. For example, in FIG. 6B, address bits A7-A0 are received at the four I/O pins, namely, pin SI/SIO0, pin SO/SIO1, pin WP#/SIO2, and pin HOLD#/SIO3. In a specific embodiment, a page includes 256 bytes which can be addressed by an 8-bit address within the page. Thus as shown in FIG. 6B, the address bits A7-A0 are arranged in four address segments of two bits each, i.e., A4 and A0, A5 and A1, A6 and A2, and A7 and A3.

A second read address is generated based on at least information associated with the second plurality of page address segments and the first plurality of address segments. For example, in FIG. 6B, a second read address is generated using address bits A23-A8 from the first plurality of address segments and address bits A7-A0 from the second plurality of page address segments. Since the second read address points to a memory location in the same page as the first read address, only eight bits of the second read address need to be transferred according to an embodiment of the invention. A read command and the duplicate address bits A23-A8 do not need to be transferred. As a result, system overhead can be reduced.

Second performance enhancement indicator is received. In FIG. 6B, performance enhance indicator bits P7-P0 are received at four I/O pins in two clock cycles separately, as discussed above.

The method includes wait n clock cycles then outputting data in the memory array in the integrated circuit using the input/output pins concurrently. The number of wait clock cycles, n, can be selected depending on the applications. For example, in a specific embodiment, n can be set to be 8 wait clock cycles. The data are associated with the second read address. As shown in FIG. 6B, data bits D7-D0 are output using four I/O pins in two clock cycles separately.

The method includes determining whether a second enhanced read operation is to be performed based on at least information associated with the second performance enhancement indicator. Here, performance enhance indicator bits P7-P0 are processed, and an enhanced read is to be performed if the following condition is met: P7≠P3 AND P6≠P2 AND P5≠P1 AND P4≠P0. In an embodiment, the enhanced read is continued as long as the performance enhance indicator is set.

According to an alternative embodiment, the invention provides a system for enhanced data read. An example of such a system is discussed above with reference to FIGS. 2-6B. For example, the system includes one or more components configured to:

1. receive a first read command, which is associated with an enhanced data read;
2. process information associated with the first read command;
3. receive a first plurality of address segments, each of the first plurality of address segments being received from each of a corresponding plurality of input/output pins concurrently;
4. generate a first read address based on at least information associated with the first plurality of address segments;
5. receive a first performance enhancement indicator;
6. determine whether an enhanced read operation is to be performed based on at least information associated with the performance enhancement indicator;
7. wait n clock cycles, where n is an integer, then output data from a memory array in the integrated circuit using the first plurality of input/output pins concurrently, the data being associated with the first read address; and
8. perform an enhanced read operation, if the enhanced read operation is to be performed.

In an embodiment, the system includes one or more components for determining whether a second enhanced read operation is to be performed based on at least information associated with the second performance enhancement indicator. In a specific embodiment for performing the enhanced read operation, the system includes one or more components for:

1. receiving a second plurality of (page) address segments, each of the second plurality of (page) address segments being received from each of the corresponding plurality of input/output pins concurrently;
2. generating a second read address based on at least information associated with the second plurality of (page) address segments;
3. receiving a second performance enhancement indicator and determining whether a second enhanced read operation is to be performed based on at least information associated with the second performance enhancement indicator; and
4. wait n clock cycles, where n is an integer, then outputting data in the memory array in the integrated circuit using the plurality of input/output pins concurrently, the data being associated with the second read address.

In a specific embodiment, the system includes an integrated circuit which includes a serial peripheral interface pin configuration, the pin configuration including pin #1 (CS#), pin #2 (SO/SIO1), pin #3 (WP#/SIO2), pin #4 (GND), pin #5 (SI/SIO0), pin #6 (SCLK), pin #7 (HOLD#/SIO3), and pin #8 (VCC). In an embodiment, the first plurality of address segments are received in six clock cycles. In a specific embodiment of the system, the first performance enhancement indicator includes four indicator bits P4, P5, P6, and P7 received in a first enhance indicator clock cycle and four indicator bits P0, P1, P2, and P3 received in a second enhance indicator clock cycle, and an enhanced read operation is determined to be performed if the following condition holds: P7≠P3 AND P6≠P2 AND P5≠P1 AND P4≠P0.

Although the above has been shown using a selected group of components, pin configuration, and timing sequences for the serial peripheral interface methods for memory device according to embodiments of the present invention, there can be many alternatives, modifications, and variations. For example, some of the pin assignments and functions can be interchanged or modified. Depending upon the embodiment, the arrangement of timing sequence may be altered. As another example, the use of falling and rising clock edges may be interchanged and modified. Many other variations, modifications, and alternatives can be implemented by one skilled in the art in view of this disclosure. For example, the invention can be applied to other memory devices such as DRAM, SRAM, parallel flash, or other non-volatile memories, etc.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for conducting a read operation in an integrated circuit, the method comprising:
   receiving a read command;
   receiving a first address in a clock cycle after receiving the read command;
   receiving a first performance enhancement indicator in a clock cycle immediately after receiving the first address while before starting to send data out, for determining whether an enhanced read operation is to be performed; and
   performing the enhanced read operation, in case of determining that the enhanced read operation is to be performed.

2. The method of claim 1, in case the enhanced read operation is performed, data in the integrated circuit are output using a plurality of input/output pins concurrently.

3. The method of claim 1, wherein performing the enhanced read operation comprises:
   receiving a second address after starting to send data out;
   receiving a second performance enhancement indicator in a clock cycle immediately after receiving the second address, for determining whether the enhanced read operation is to be performed based upon the second performance enhancement indicator; and
   waiting n clock cycles, where n is an integer, then outputting data in the integrated circuit, the data being associated with the second read address.

4. The method of claim 1 wherein determining whether the enhanced read operation is to be performed comprises comparing a first bit in the first performance enhancement indicator with a second bit in the first performance enhancement indicator.

5. The method of claim 1 wherein the first performance enhancement indicator includes indicator bits P4, P5, P6, and P7 received in a first enhance indicator clock cycle and indicator bits P0, P1, P2, and P3 received in a second enhance indicator clock cycle, each of the indicator bits received in the first enhance indicator clock cycle being compared to a corresponding one of the indicator bits received in the second enhance indicator clock cycle.

6. The method of claim 5 wherein the enhanced read operation is determined to be performed if the following condition holds: P7≠P3 AND P6≠P2 AND P5≠P1 AND P4≠P0.

7. The method of claim 1, wherein the read command is a page read command and the first address indicates a page to be read.

8. The method of claim 1, wherein the first performance enhancement indicator is received during a waiting period which is just after receiving the first address and before starting to send data out.

9. A system for enhanced data read, the system comprising: one or more components configured to:
  receive a read command;
  receive a first address in a clock cycle after receiving the read command;
  receive a first performance enhancement indicator in a clock cycle immediately after receiving the first address while before starting to send data out;
  determine whether an enhanced read operation is to be performed based upon the first performance enhancement indicator; and
  perform the enhanced read operation in case of determining that the enhanced read operation is to be performed.

10. The system of claim 9, in case the enhanced read operation is performed, data in the integrated circuit are output using a plurality of input/output pins.

11. The system of claim 9 wherein the one or more components are further configured to:
  receive a second address;
  receive a second performance enhancement indicator in a clock cycle immediately after receiving the second address, for determining whether the enhanced read operation is to be performed; and
  waiting n clock cycles, where n is an integer, then outputting data in the memory array in the integrated circuit, the data being associated with the second read address.

12. The system of claim 9 wherein the first performance enhancement indicator includes indicator bits P4, P5, P6, and P7 received in a first enhance indicator clock cycle and indicator bits P0, P1, P2, and P3 received in a second enhance indicator clock cycle, wherein the enhanced read operation is determined to be performed if the following condition holds: $P7 \neq P3$ AND $P6 \neq P2$ AND $P5 \neq P1$ AND $P4 \neq P0$.

* * * * *

UNITED STATES PATENT AND TRADEMARK OFFICE
CERTIFICATE OF CORRECTION

PATENT NO. : 8,341,330 B2  
APPLICATION NO. : 11/970468  
DATED : December 25, 2012  
INVENTOR(S) : Hung et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 517 days.

Signed and Sealed this
Eighteenth Day of November, 2014

Michelle K. Lee
*Deputy Director of the United States Patent and Trademark Office*